Apr. 17, 1923.
J. L. DONAT
1,452,291
RESILIENT WHEEL FOR VEHICLES
Filed Dec. 26, 1919
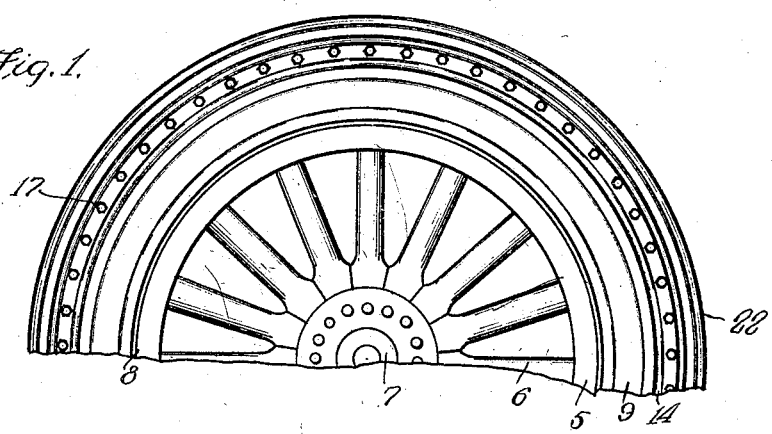
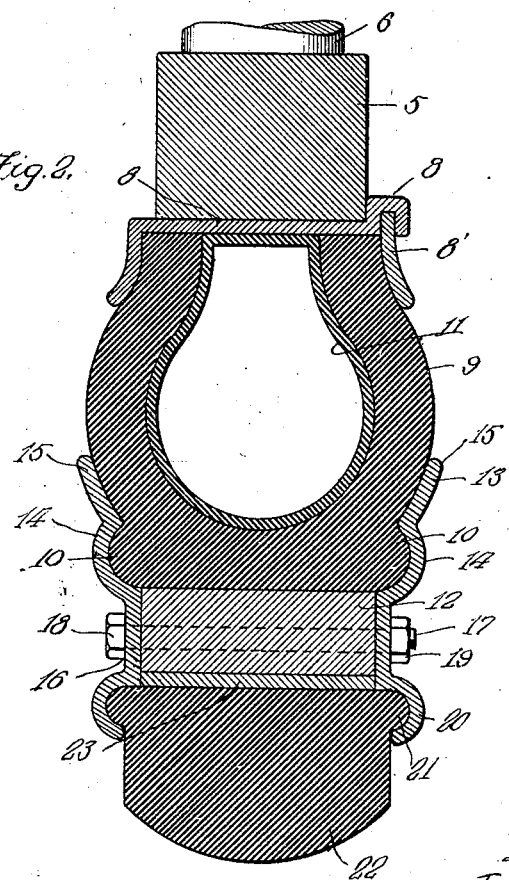
Inventor:
Joseph L. Donat.
By Jones Rain & Hinkle
Attys.

Patented Apr. 17, 1923.

1,452,291

UNITED STATES PATENT OFFICE.

JOSEPH L. DONAT, OF CHICAGO, ILLINOIS.

RESILIENT WHEEL FOR VEHICLES.

Application filed December 26, 1919. Serial No. 347,257.

*To all whom it may concern:*

Be it known that I, JOSEPH L. DONAT, a citizen of the United States, residing at Chicago, in the county of Cook and State of Illinois, have invented certain new and useful Improvements in Resilient Wheels for Vehicles, of which the following is a specification.

This invention relates to improvements in resilient tires.

One of the objects of the invention is to provide a composite tire of a pneumatic member and a surrounding cushion member with an intermediate floating rim of a peculiar character.

Another object is to provide circumferentially extending clincher beads on the pneumatic casing and similar beads on the cushion tire and side rings engaging the beads on both tires.

Another object is to provide a composite tire, as characterized above, with a floating ring therebetween to support the side rings.

Other, further and more specific objects of my invention will become readily apparent, to persons skilled in the art, from a consideration of the following description when taken in conjunction with the drawings, wherein:—

Fig. 1 shows a side elevation of one-half of a tire containing my invention.

Fig. 2 is a cross sectional view of the circumferential part of the wheel.

In both views the same reference characters are employed to indicate similar parts.

5 is a felly or rim of the wheel connected to the spoke 6, and 7 is the hub of the wheel. 8 is the usual rim for straight side casing tires. 9 is a straight sided casing having laterally projecting circumferentially extending beads 10 near the tread face thereon. Inside of the casing is a pneumatic tube 11. The structure so far described is common with ordinary pneumatic tires with the exception of the beads 10. Surrounding the casing 9 is a ring 12, preferably of wood, and secured to the side of the ring are flat metal rings 13. The rings 13 are provided with outwardly curved parts 14 to overlie the beads 10 and inwardly extending parts 15 to support the side walls of the casing 9. The rings are also provided with flat annular portions 16 thru which bolts 17 may pass and for receiving the heads 18 and the nuts 19. The outer edge of the ring 13 is also provided with an outwardly, curved circumferentially extending part 20. The parts 20 of the two rings overlie the beads 21 made on opposite sides of the cushion tire 22. An iron or metal ring 23 is preferably located between the wooden ring 19 and the cushion tire 22.

The composite cushion and pneumatic tire may be removed from the rim 8 by taking off the ring 8' when the entire device may be removed from the wheel. But when it is desirable to disassociate the casing 9 from the cushion 22, the side rings 13 may be removed by taking out the bolts 17 that pass thru the ring 19.

The cushion tire 22 and the ring 19 protect the pneumatic tire so completely from destructive effects of the surface over which the vehicle is to pass as to render it practically immune from puncture, at the same time the cushioning and vibration absorbing effect of the tire is preserved.

Having described my invention, what I claim is new and desire to secure by Letters Patent is:—

1. A device of the character described having in combinative association a pneumatic tire casing with laterally extending, circumferential beads, near its outer edge; a cushion tire having similar beads near its inner edge, overlying the pneumatic tire; a ring between the casing and tire; and metal side rings, one on each side of the tire and casing, each ring having outwardly curved, circumferentially extending parts to overlie the respective beads on both tires, and an inner outwardly turned annular portion adapted to partially enclose the pneumatic tire casing; and bolts passing thru said side rings and the intermediate ring to hold the parts together.

2. A device of the character described having in combinative association a pneumatic tire casing with laterally extending circumferential beads, near its outer edge; a cushion tire having similar beads near its inner edge; a wooden ring between the casing and tire;

a relatively thin metal ring surrounding the wooden ring; and metal side rings, one on each side of the tire and casing, having outwardly curved circumferentially extending parts to overlie the respective beads of the casing and cushion tire, and an inner outwardly turned annular portion adapted to partially enclose the pneumatic tire casing; and bolts passing thru said side rings and thru the wooden intermediate ring to hold the parts together.

In testimony whereof I hereunto subscribed my name.

JOSEPH L. DONAT.